Figure 1:
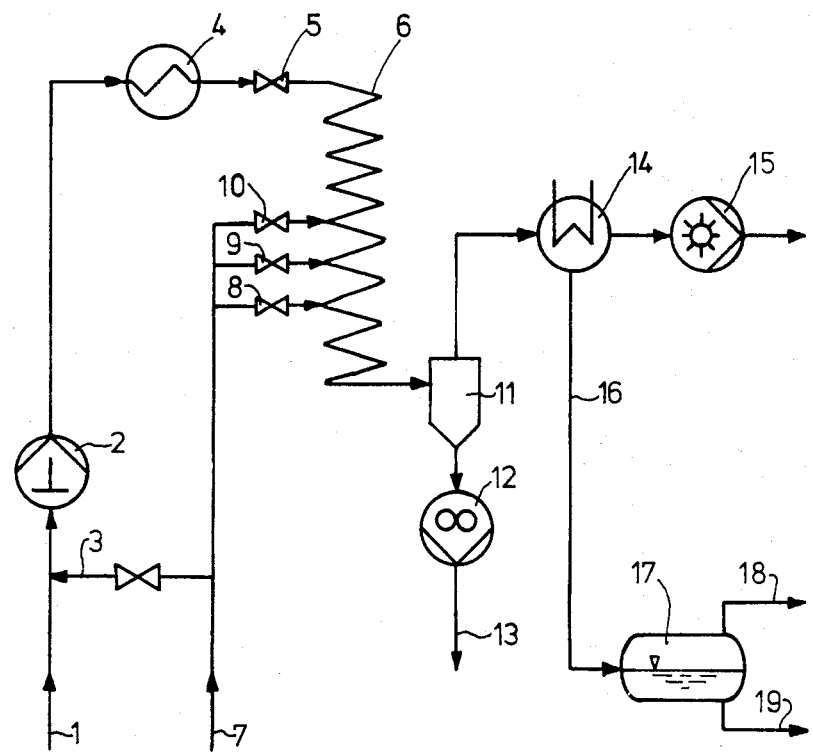

United States Patent [19]

Goldmann et al.

[11] Patent Number: 4,533,432
[45] Date of Patent: Aug. 6, 1985

[54] CONTINUOUS PROCESS FOR THE CONCENTRATION OF W/O-EMULSIONS BY EVAPORATION

[75] Inventors: Gerd Goldmann; Georg Spott; Christian Fröhlich, all of Krefeld, Fed. Rep. of Germany

[73] Assignee: Bayer Aktiengesellschaft, Fed. Rep. of Germany

[21] Appl. No.: 507,148

[22] Filed: Jun. 23, 1983

[30] Foreign Application Priority Data

Jul. 3, 1982 [DE] Fed. Rep. of Germany ....... 3224994

[51] Int. Cl.³ ............................................. B01D 1/02
[52] U.S. Cl. .......................... 159/47.1; 159/DIG. 9; 159/DIG. 16

[58] Field of Search ................ 208/187, 188; 523/331, 523/307, 340, 342; 159/47.1, DIG. 9, DIG. 10, DIG. 11, DIG. 15, DIG. 16, DIG. 17, DIG. 24

[56] References Cited

U.S. PATENT DOCUMENTS 3,915,712 10/1975 Herzhoff et al. ........... 159/DIG. 16

Primary Examiner—Frank Sever
Attorney, Agent, or Firm—Connolly and Hutz

[57] ABSTRACT

The continuous process makes it possible to reduce the water content of polymers to minor residual levels (ppm) by adding to a W/O-emulsion an extractant which is subsequently evaporated with the oil.

4 Claims, 1 Drawing Figure

CONTINUOUS PROCESS FOR THE CONCENTRATION OF W/O-EMULSIONS BY EVAPORATION

This invention relates to a continuous process for the concentration by evaporation of W/O-emulsions of the type which accumulate in the emulsion polymerisation of ethylenically-unsaturated, water-soluble monomers.

Processes for the polymerisation of ethylenically-unsaturated water-soluble monomers in "reverse emulsion" i.e. in W/O-emulsion "water-in-oil" are known from the patent literature. To this end, aqueous monomer solutions are emulsified in an inert hydrocarbon (dispersant oil) by means of a W/O-emulsifier and the resulting emulsion is heated in the presence of a peroxidic catalyst (DE-OS No. 10 89 173) or irradiated with UV-light in the presence of a photoinitiator soluble either in the aqueous or oil phase (De-OS No. 23 54 006).

According to De-OS No. 24 19 764, a non-aqueous dispersion of the water-soluble polymer having a residual water content of less than 5% by weight, based on the polymer, can be obtained from the resulting reaction mixture by the azeotropic removal of water. This dispersion, which is ready for use, has a relatively low polymer content of from about 35 to 36% by weight, based on the total dispersion as a whole.

However, since importance is attached primarily to the polymer as active substance for standard applications, DE-OS No. 29 26 103 describes a non-aqueous dispersion having an increased polymer content of from 45 to 60% and a residual water content of less than 5%, based on the polymer. In the Examples of DE-OS No. 29 26 183, a polymer content of 57% was obtained for a residual water content of 2% using a rotary evaporator on a laboratory scale.

However, considerable difficulties are involved in concentrating this emulsion or other emulsions emanating from W/O-polymerisation on an industrial scale.

The reason for this is that, as is generally known in connection with emulsions, concentration of the outer phase by evaporation "mostly" leads to breaking of the emulsion (Ullmann's Enzyklopädie der Technischen Chemie, München 1975, Vol. 10, p. 453). In the present case, coalescence and coagulation are far more probable because, in addition to the outer phase, the inner phase (i.e. the water) preferentially evaporates as well and the emulsion itself changes during the evaporation process into a non-aqueous dispersion of the polymer in the oil phase.

DE-OS No. 20 64 101 mentions the fact that, in the concentration of similar emulsions by evaporation to form a non-aqueous dispersion, the transition from emulsion to dispersion involves a "critical phase" during which time "the system shows a marked tendency to coagulate".

In addition, it has been observed that the emulsions in question break on the addition of water. This results in sensitivity to recondensation or mixing with condensate droplets which lead locally to breaking of the emulsion and hence to the separation of solids.

Where concentration by evaporation is carried out in batches, low coagulation rates can be compensated by using suitable apparatus. However, continuous concentration by evaporation is hampered by the coagulation of even small quantities of polymer because the precipitating polymer leads to rubber-like or hard coatings on the heating surface and to blockages and clumps in the evaporator outlet and in the vapour separator. Even in thin-layer evaporators, deposits are soon formed on wipers. In this connection, it has been impossible to find any evaporation conditions under which uninterrupted operation is possible over prolonged periods. In the case of falling-film vaporators, even minor deposits result immediately in disruption of the evaporation process and, hence, in growth of the coatings.

The object of the present invention is to provide a process which is not attended by any of the disadvantages referred to previously.

According to the invention, this object is achieved that in a flow tube with at least two phase streams a W/O-emulsion having a water content of more than 25% by weight and a polymer content of from 28 to 40% by weight is converted in vacuo at a temperature in the range from 50° to 190° C. into a non-aqueous polymer dispersion in oil having a residual water content adhering to the polymer of less than 14% by weight (based on the polymer) and a polymer content of from 45 to 65% by weight.

It has been found that a W/O-emulsion may be continuously concentrated by evaporation without the formation of troublesome deposits in a multiphase flow tube which may be formed, for example, by a round helical tube with several separate phases.

It was surprising to the expert to find that the known severe sheer stressing which is exerted on the liquid by the vapour flowing at high speed in tubes of the type in question does not bring about any coagulation either in the emulsion itself or even during the critical transition from emulsion to dispersion.

In addition, the emulsion or dispersion remains so stable that no deposits could be observed, even in the following vapour separator.

In one particular embodiment, the temperature is in the range from 80° to 140° C. because the vacuum may be established with simple means at temperatures in this range and even temperature-sensitive emulsions can be concentrated by evaporation without damage.

In another embodiment, final water contents of up to <2% (based on aqueous polymer) are established or adjusted by diluting the outer phase of the emulsion with the dispersant oil itself or with another substance soluble therein.

Through this measure, it is possible further to reduce the water content for the same polymer concentration by diluting the outer phase with more dispersant oil, followed by evaporation to the same solids content.

In another embodiment, dilution is carried out during the evaporation process by introducing the diluent into the tube.

In addition to the known procedure of adding diluent before evaporation, it is possible for the diluent to be added in stages during the vaporation process. In this case, it is best to use the same dispersant oil as used in the reaction because the evaporated dispersant oil may then be re-used during the reaction.

It is of particular advantage to apply the process to monomer emulsion having particle sizes of from 50 to 200 nm.

One example of an embodiment of the process according to the invention is illustrated and described in detail in the following with reference to the accompanying drawing which is a flow chart.

FIG. 1 shows one embodiment of the apparatus used for carrying out the process according to the invention.

The emulsion emanating from the reaction is delivered through a pipe 1 and a pump 2 to a preheater 4 and placed under a vacuum through a throttle valve 5, resulting in the formation of a vapour component. At the end of a helical flow tube 6, the emulsion concentrated by evaporation is separated from the vapours in a heatable separator 11 and discharged through a pipe 13 by a gear pump 12. The vapours are collected in the condenser 14 and discharged by a pump or preferably barometrically through pipe 16 into a phase separator 17. Organic and aqueous phase 18 and 19 are returned for the formation of new reaction product. The vacuum is generated by a liquid ring pump 15 or by other suitable means.

The dispersant oil for diluting the outer phase is either introduced into the reaction solution through a pipe 7 and a pipe 3 or through pipe 7 directly metered into the tubular coil evaporator at one or more points through pipes 8, 9, 10. In this case, the oil is preferably introduced at boiling temperature.

A helical tube (tube diameter/curvature diameter = 0.01–0.2, pitch h = 1–5 tube diameter) is preferred to other possible constructions for the forced-circulation flow tube.

The emuslion is advantageously delivered to the flow tube in such a way that, on entry into the tube, a certain vapour component is immediately produced by flash evaporation. In operation under normal pressure, the vapour component should exceed 5% by weight. In operation in vacuo, the minimum vapour component is determined by the requirement that the dynamic pressure $\rho u^2 / 2$ ($\rho$ = density, u = velocity) of the flowing vapour phase should assume at least the same value as under normal pressure.

Any liquid which is immiscible with water or with the aqueous monomer solutions may be used as the dispersant oil. It is preferred to use liquid aliphatic and aromatic hydrocarbons and substitution products and mixtures thereof, such as benzene, toluene, xylene, cyclohexane, decalin, tetralin, mineral oils, kerosene, petroleum, petrol, white spirit and mixtures thereof. Aliphatic $C_8$–$C_{20}$-hydrocarbons and mixtures thereof are particularly preferred.

EXAMPLE 1

10 kg/h of an emulsion having the following composition:
 oil phase 81.6% of a $C_{10}$–$C_{12}$-paraffin mixture;
 9.2% of sorbitan monooleate;
 9.2% of the ethoxylate of oleic acid with 6 moles of ethylene oxide;
 aqueous phase 55.3% of acrylamide/acrylic acid copolymer
 (monomer ratio = 4.22:1);
 44.7% of water
phase ratio: aqueous phase:oil phase = 1.82:1 are delivered to a tubular coil (diameter: 10 mm, curvature diameter: 190 mm, length: 3750 mm) at a temperature of 85° C. The heating medium temperature is 100° C., the pressure in the vapour separator is 100 mbars, the final concentration is 51 to 57% by weight and the final water content is approximately 9.5 to 13.6% by weight (based on aqueous polymer). The condensate separates into two phases, the percentage of aqueous phase amounting to approximately 77%. Over a test period of 6.5 hours, no deposits were formed either in the evaporator or in the vapour separator.

EXAMPLE 2

20% of a $C_{10}$–$C_{12}$-paraffin oil mixture are added to the product dispersion of Example 1 having a polymer concentration of from 51 to 57% by weight and a water content of approximately 9.5 to 13.6% (based on aqueous polymer), followed by concentration by evaporation in the tubular coil. For polymer concentrations of 48 to 52%, the water content amounts to between 1.4 and 2.1% by weight (based on aqueous polymer).

We claim:

1. A continuous process for the concentration by evaporation of W/O-emulsions of the type accumulating in the emulsion polymerization of ethylenically-unsaturated, water-soluble monomers, comprising precluding polymer precipitation on the heat exchange surfaces of a helical multiphase flow tube with at least two phase streams by converting a W/O-emulsion having a water content of more than 25% by weight and a polymer content of from 28 to 40% by weight in vacuo at temperatures of from 80° to 140° C. into a non-aqueous polymer dispersion in oil having a residual water content adhering to the polymer of less than 14% by weight (based on polymer) and a polymer content of from 45 to 65% by weight.

2. A continuous process as claimed in claim 1, characterised in that final water contents of up to <2% (based on aqueous polymer) are established or adjusted by diluting the outer phase of the emulsion with the dispersant oil itself or with another substance soluble therein, followed by concentration by evaporation.

3. A continuous process as claimed in claim 2, characterised in that dilution is carried out during the evaporation process by introducing the diluent into the flow tube.

4. A continuous process as claimed in claim 1, characterised in that dilution is carried out during the evaporation process by introducing the diluent into the flow tube.

* * * * *